United States Patent
Martin et al.

[11] Patent Number: 6,147,709
[45] Date of Patent: Nov. 14, 2000

[54] METHOD AND APPARATUS FOR INSERTING A HIGH RESOLUTION IMAGE INTO A LOW RESOLUTION INTERACTIVE IMAGE TO PRODUCE A REALISTIC IMMERSIVE EXPERIENCE

[75] Inventors: H. Lee Martin; Laban P. Jackson, both of Knoxville, Tenn.

[73] Assignee: Interactive Pictures Corporation, Oakridge, Tenn.

[21] Appl. No.: 08/835,210

[22] Filed: Apr. 7, 1997

[51] Int. Cl.[7] ............................... H04N 5/262; H04N 9/76
[52] U.S. Cl. .................... 348/239; 348/240; 348/561; 348/598
[58] Field of Search .................... 348/239, 240, 348/231, 143, 274, 358, 578, 561, 584, 586, 598

[56] References Cited

U.S. PATENT DOCUMENTS

| | | | |
|---|---|---|---|
| Re. 36,207 | 12/1999 | Zimmermann et al. | 348/143 |
| 4,800,379 | 1/1989 | Yeomans | 340/731 |
| 5,023,725 | 6/1991 | McCutchen | 358/231 |
| 5,142,642 | 8/1992 | Sudo . | |
| 5,185,667 | 2/1993 | Zimmermann | 358/209 |
| 5,200,818 | 4/1993 | Neta et al. | 358/87 |
| 5,251,022 | 10/1993 | Kitamura | 358/528 |
| 5,329,310 | 7/1994 | Liljegren et al. | 348/147 |
| 5,384,588 | 1/1995 | Martin et al. | 348/15 |
| 5,396,583 | 3/1995 | Chen et al. | 395/127 |
| 5,668,595 | 9/1997 | Katayama et al. | 348/218 |
| 5,796,426 | 8/1998 | Gullichsen et al. . | |
| 6,005,611 | 12/1999 | Gullichsen et al. | 348/143 |

Primary Examiner—Wendy Garber
Assistant Examiner—Jacqueline Wilson
Attorney, Agent, or Firm—Banner & Witcoff, Ltd.

[57] ABSTRACT

A method of inserting a high resolution image into a low resolution interactive image provides a greater sensation of virtual reality (presence) because increased magnification of the low resolution image, typically a wide angle image, reduces the sensation of virtual presence in the image. For example, according to the invention, as an image of the wall of an art gallery becomes magnified in a virtual presence experience, a rectangular or other planar image portion such as a painting that the user zooms on is replaced with a high resolution image stored and associated in memory. The virtual presence may be achieved by high resolution scanning a desired section of an image portion for overlay into the image scanned into a second memory at lower resolution. The high resolution image for insertion may be a dewarped portion of a fish-eye lens captured interactive image. Preferably, at least three reference points in the wide angle image and the planar image portion for insertion, such as the painting image, are identified and stored with the image data and a selected or predetermined magnification level. In this manner, the three image points can be manipulated and matched from the high resolution image to the perspective of the wide angle image. Also, for identity of perspective, the wide angle and high resolution images may be captured from the identical camera location. As the user inputs viewing angle criteria, such as pan and tilt angles, the rectangular image may be manipulated to match. The camera may be digital or analog, video, movie or still. Also, a high resolution photographic image may be inserted into a graphic image or vice versa.

33 Claims, 3 Drawing Sheets

(ALL HR)

METHOD AND APPARATUS FOR INSERTING A HIGH RESOLUTION IMAGE INTO A LOW RESOLUTION INTERACTIVE IMAGE TO PRODUCE A REALISTIC IMMERSIVE EXPERIENCE

BACKGROUND OF THE INVENTION

1. Technical Field

The present invention relates to the field of providing a virtual interactive experience of viewing an image and, more particularly, to inserting a high resolution image into a low resolution interactive image to produce a realistic immersive experience.

2. Description of the Related Arts

Technology for providing a totally immersive experience is becoming increasingly prevalent. A number of alternative methods are known. One proposal is promoted by Apple Computer and is represented by U.S. Pat. No. 5,396,583. A user of the products of this technology is surrounded by a cylindrical representation or view as if they were standing at the center of the cylinder. The user can look anywhere around a 360 degree representation by controlling their viewing through a user input such as a mouse or joystick. They cannot look straight up or down but can look all around themselves. A related experience is provided by Microsoft Surround technology. Still others patch together a collection of still flat images into a whole image, for example, in the form of the patchwork or a buckey ball carbon 12 molecule or a soccer ball.

Another totally immersive experience is described by Omniview's U.S. Pat. No. 5,185,667. This patent describes the capture of a hemispherical image by using a fisheye lens. Further improvements to the technology are described by U.S. Pat. Nos. 5,359,363 and 5,384,588 and by U.S. patent application Ser. Nos. 08/339,663, 08/386,912, 08/494,599 and 08/516,629. The improvements describe an immersive experience provided by joining two or more hemispherical images together as a sphere or "bubble" and, further, permitting travel through several such spherical representations by "tweening." For example, a user can be guided to move through a museum tour, look backwards and forwards, to their right, left, up or down and follow the tour, for example, through a space technology museum, pausing to listen or view special presentations by actuating "hot spots" or buttons that are visually provided the user as the user is conducted on their tour.

Generally, these technologies involve interactive computer photography based upon digital input to the computer processor of photographic images obtained using standard, wide angle or fisheye lenses or mirrors to reflect a wide angle image into a standard lens. After initial processing of the digitized images to join them together, the technologies further permit the user to interactively select viewing angles for viewing the digitized and processed image and magnification (or zoom) values to view selected portions in detail. The digital processing involves removing any mirror, wide angle or fisheye lens distortion and providing a perspective-corrected image portion for viewing at the user's command.

While these methods differ in coverage and approach, they all limit the amount of magnification available due to image resolution limitations, for example, because the file size for the digital interactive image is likewise limited due to memory or transmission constraints. Consequently, there remains a need in the art to further enhance the resolution of interactive images or image portions so that magnification and zoom features can be enjoyed by users and, thus, an object of the present invention is to permit selective high resolution image insertion into the viewed image portion of an interactive image.

SUMMARY OF THE INVENTION

A method of inserting a high resolution image into an interactive lower resolution image comprises the steps of storing the typically lower resolution interactive image, storing the high resolution image to be inserted, receiving selection signals related to insertion and positioning of the high resolution image in the interactive image, and outputting a composite image. For example, the image to be inserted may be a geometrically skewed rectangular image and the insertion is directed by input data as to the location of three or more, for example, four corners of the stored rectangular image. The high resolution image is continuously inserted over the interactive lower resolution interactive image and enhances a portion of the interactive image as a level of magnification is increased. Thus, at first, the high resolution image replaces the lower resolution interactive image when a level of magnification of the interactive image is exceeded and continues to replace the lower resolution image as magnification increases. Moreover, the rectangular image may be made to "travel" through the interactive image in an interactive composite image, for example, by further increase in magnification or zoom, or by selection of different viewing angles such as pan, tilt and rotation.

To achieve a perspective match between the interactive image and the inserted image, the two images may be captured at the same camera location during the same photography shoot. Alternatively, the same photographic image can be scanned at two different resolutions, selecting the portion for high resolution when the low resolution threshold is exceeded and creating a dewarped (undistorted) output image from the high resolution scanned image. For example, a rectangular painting of an art gallery may be inserted at high resolution into a lower resolution interactive image taken of the gallery room wall, including the painting. Consequently, the painting images, for example, are simply cropped and scaled to match the inserted overlay with the background wall of the art gallery. The result is a method that not only makes accurate output results, it easily produces the results. Also, as described above, the images are easily captured at the same time, simply by changing camera lenses, the painting captured using a zoom lens at high resolution and the gallery wall, for example, captured by a wide angle or fisheye lens or by applying a wide angle mirror to the standard lens. Thus, the file sizes needed to independently store each image are manageable and a high resolution output image of the painting can result on user command.

Further details of the present invention will be understood from reading the detailed description of the invention which follows and by studying the accompanying drawings.

BRIEF DESCRIPTION OF THE DRAWINGS

FIG. 4 represents an application of the present invention for moving from one room of a building to another, wherein

DETAILED DESCRIPTION

Figure 2:
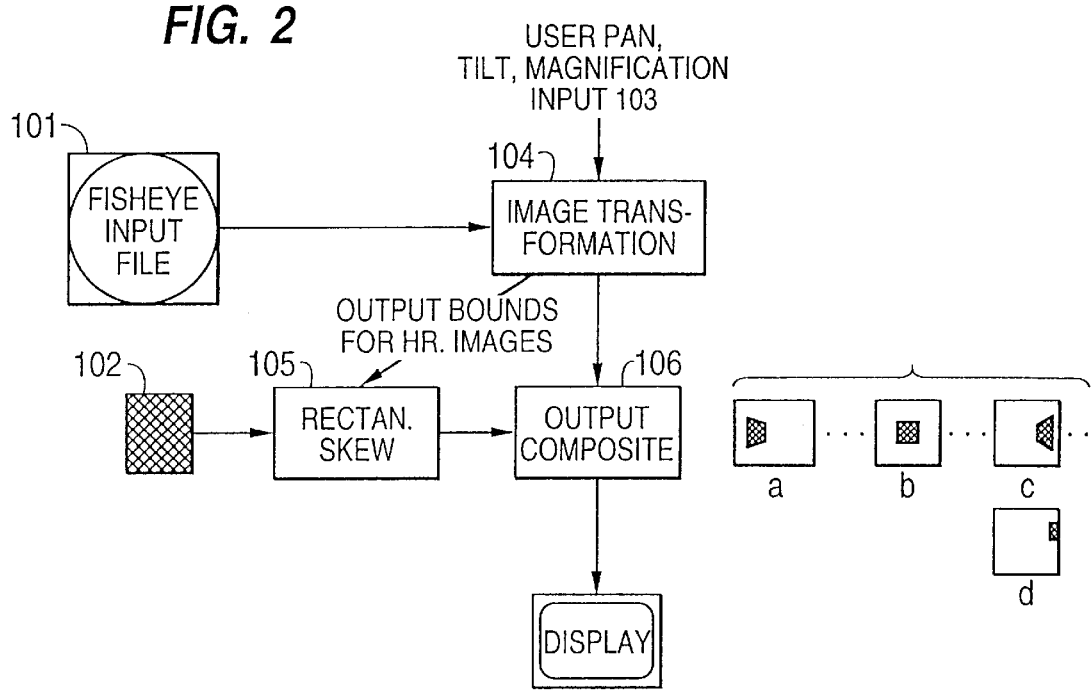
FIG. 2 provides a detailed schematic overview of the steps of the method of inserting the high resolution image into an interactive image for selective display and FIG. 3 provides exemplary screen outputs showing a high resolution rectangular image inserted into an interactive image such that the high resolution image replaces the similar image portion of the interactive image where

Referring first briefly to FIG. 2, an overview of the present invention will be provided. The present invention relates to a method and apparatus for insertion of a high resolution image into a typically lower resolution image, for example, when the degree of magnification reaches a predetermined value from user selection of zoom level via a joystick or other input device. The present invention involves the application of a computer processor and memory for processing an interactive image and at least one high resolution image for display as a composite image. One image file is stored for an interactive image, which may be a video sequence of images, captured, for example, with a wide angle or fish-eye lens or via a mirror and standard lens at step 101. One or more high resolution images for insertion into the interactive image are captured with a camera and stored at step 102. Photographic images may be captured with an analog or digital camera, a still, movie or video camera. The images to be inserted and the interactive image are separately stored and merged upon user command provided at step 103. Also, the images into which high resolution photographic images are inserted may be graphic images. The user entered command or command sequence typically is received via an input device such as a mouse or joystick. The command may comprise a selection of viewing angle including pan and tilt and rotation and a selection of a degree of magnification or zoom.

As the degree of magnification of the interactive image file stored at step 101 increases, the resolution decreases and some fuzziness may begin to appear in the displayed output image. At a predetermined level of magnification selected, for example, by a studio and prestored with the image, image transformation processor 104, typically employed for providing a perspective corrected image portion of the wide angle image for display, is actuated to further obtain the rectangular image(s) stored at high resolution from memory at step 105. The processor manipulates and matches it to the wide angle, interactive image and at step 106, overlays the high resolution image over the perspective corrected image portion it replaces. To do so, the interactive image must have associated memory address data to retrieve the high resolution image(s). The image(s) to be inserted, once retrieved, have their insertion points matched against the insertion points of the interactive image, are manipulated as necessary and inserted into the interactive image. As will be further described herein, one way to assure correct overlay is to match the corner pixel data for the high resolution image to be inserted with the pixel data of the perspective-corrected, interactive image portion. Three points define a plane, so, at least three different points of pixel data, preferably, four corner points, are used to match the high resolution image to the low resolution interactive image. Once the high resolution image is matched and inserted into the interactive image, the user of the present system will be able to view the high resolution image(s) as a substitute for the lower image resolution interactive image portion overlaid. Also, as the viewer selects new pan and tilt angles, the high resolution image moves with the interactive image as a composite whole. If the viewer continues to magnify the high resolution image portion, the high resolution image pixels will provide the increased resolution the viewer requests.

Figure 1:
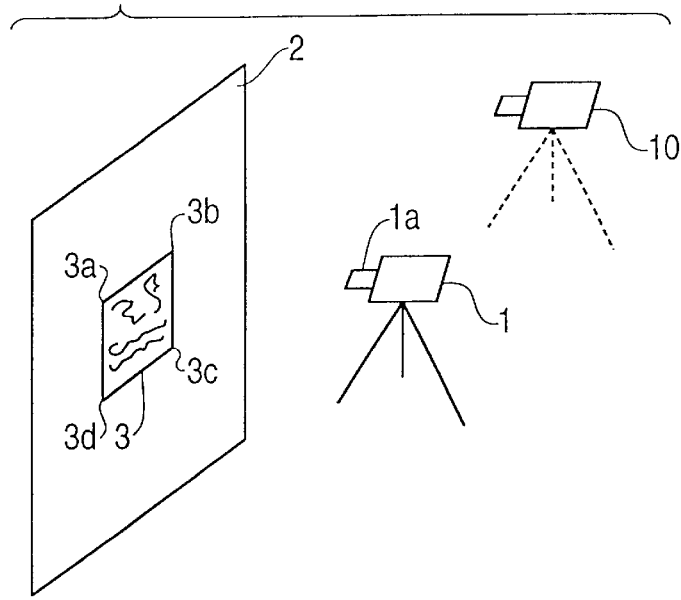
FIG. 1 provides a perspective view of a method of capturing a high resolution image for insertion into an interactive image portion which may be captured from the same camera location.

Now that the invention has been described in some detail, referring to FIG. 1, there is suggested a method and apparatus for capturing the interactive and higher resolution images. Other methods may come to mind that can comparably obtain similar images. However, the described method has the advantage of capturing both images from the identical perspective.

In particular, an analog or digital, still or video camera 1 is placed on a tripod and pointed toward an image area to be captured. For example, the image area may represent a wall 2 of an art gallery and the higher resolution image(s) to be captured is represented by one or more paintings 3 hanging on the wall 2 of the gallery. Lens 1a of camera 1 may be interchangeable, and tripod 1 may be arranged in accordance with pending U.S. patent application Ser. Nos. 08/494,599 and 08/516,629 of the same assignee., so that, for example, two hemispherical views of the room of the art gallery may be obtained and so capture details of the entire room by rotating camera 1 through 180 degrees. Alternatively, camera 1 may be rotated through 360 degrees to capture several wide angle lens images which would together comprise a cylindrical image in accordance with the teachings of U.S. Pat. No. 5,396,583 and its progeny, assigned to Apple. Also, a parabolic mirror reflector may be used with a normal lens alternatively to a fisheye lens to capture a 180 degree viewing experience (not shown). Finally, a series of rectangular images taken from a normal camera may be seamed together to achieve a similar interactive effect or other means and methods applied.

Continuing to refer to FIG. 1, while the camera 1 is pointed in the direction of wall 2, the lens may be interchangeable and a high resolution zoom image captured of just the rectangular painting 3 by changing the lens to a zoom or other magnification, high resolution lens. Consequently, the high resolution image of the painting alone will be captured at the same time and from the same camera location as the lower resolution, wider angle image. The same result may be achieved by obtaining a single picture of the wall 2 and digitally scanning the wall photograph 2 at a first level of resolution and then scanning the wall picture portion 3 at a much higher level of resolution. For example, digitally scan a photograph of the wall 2 at 1000×1000 and the photographic portion including the pictures 3 at 4000×4000 and keep selected portions of the wall (such as the pictures) for high resolution insertion.

Each of the images may be separately captured and stored. The camera location may be moved closer to the painting and in the same line as the original location to the painting to capture a higher resolution image of a painting. If the image is captured on film, the images are each processed by scanning and storing as digital image files. If the image is captured digitally, the digital image files are simply stored as such in computer processor memory. The interactive image file comprises associated memory address data for addressing the memory containing the associated high resolution image files. Thus, when the image is zoomed in on painting 3, the image of painting 3 can be retrieved from high resolution image memory when appropriate. It is not inconceivable that two or more paintings (involving two or more high resolution images) may be associated with a single interactive image. Also, in the same perspective corrected portion, two or more high resolution images may be overlaid in the interactive image at the same time when a predetermined level of magnification is reached (not shown).

Referring now to FIG. 2, the method of the present invention will be described in further detail. In accordance with U.S. Pat. 5,185,667, the low resolution input file, for example, a wide angle or fisheye lens captured file is stored at a local computer processor to its user. The computer processor may be the user's personal computer processor and the file digitally downloaded to the processor from a remote processor over the Internet, over telephone data lines or other media, for example, as taught by U.S. Pat. No. 5,384,588. In advance of transmission, the digital files may be compressed using a known standard, for example, MPEG2 or H.263.

In the alternative, the computer processor may be at the location to which the camera images have been transported after their capture. In other words, the studio responsible for taking the images may utilize its own processor for manipulating the images.

In particular, a studio designs the presentation of a combined image in such a way that, in a sequence of interactive images and at a time when a predetermined value of magnification of the interactive image sequence is reached, the one or more high resolution images is inserted therein. To do so, an associated data file with the interactive image file provides the address in memory for any associated high resolution image(s) or image portion to be inserted. An image transformation algorithm is performed on the interactive image stored at step 101 until a value of magnification is reached that is selected and predetermined by the studio. At that level of magnification, typically, the painting portion 3 of the interactive image may begin to blur.

According to the principles of the present invention, any high resolution images associated with the interactive image are retrieved from memory and associated with the interactive image. The predetermined reference points of the high resolution image for insertion, such as at least three different points such as three of the image corners 3a, 3b, 3c and 3d are matched against lower resolution perspective corrected view 2 that is output of the image transformation process 104. While four points are described, any three points would sufficiently define a planar area such as rectangular painting 3.

Figure 3A:
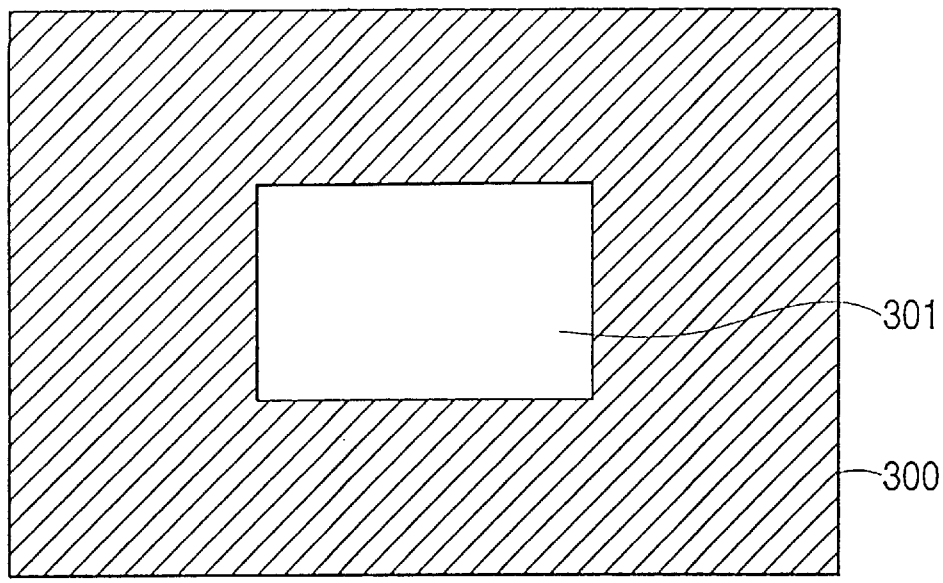
FIG. 3a shows a first frame of a sequence where the high resolution portion 301 comprises a small portion of a whole low resolution interactive image 300.

The high resolution image 3 or a portion thereof as required is inserted into the perspective corrected lower resolution image 2 and as the image is further magnified, most of the low resolution image becomes replaced by the higher image resolution painting 3 in image sequence. Referring to FIG. 3a, the wall image 300 is becoming increasingly magnified as the user zooms in on picture 301. FIG. 3a may represent that degree of magnification when the perspective corrected image portion 300 is to be overlaid with high resolution image 301. Three or more points in the image portion 301 are matched with corresponding points in the perspective corrected image 300 by comparing their pixel values and adjacent pixel values. Corner values or values that show high degrees of differentiation from adjacent pixels are preferred for a more perfect match.

Figure 3B:
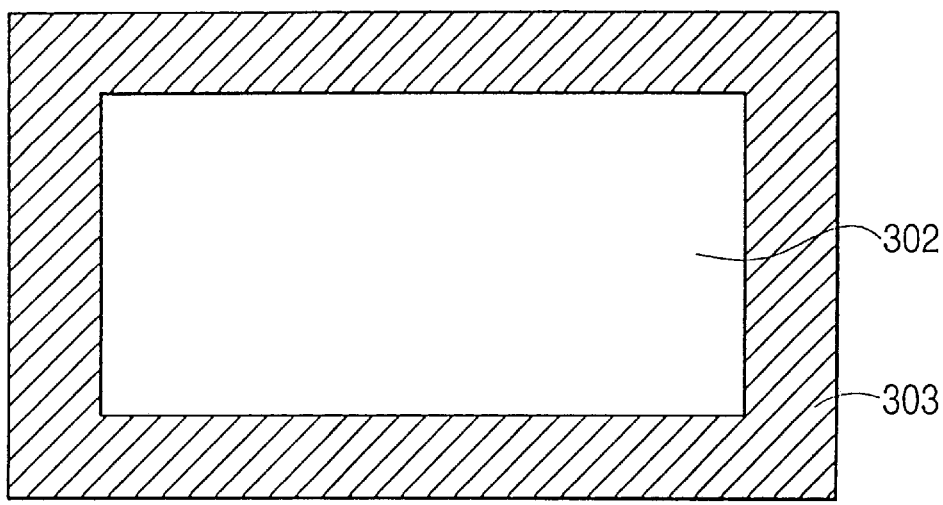
FIG. 3b represents an intermediate frame in a sequence in which the high resolution image 302 substantially replaces the low resolution interactive image 303 and FIG. 3c represents an entirely high resolution image.
Figure 3C:
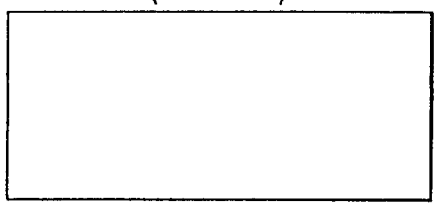
Figure 4A:
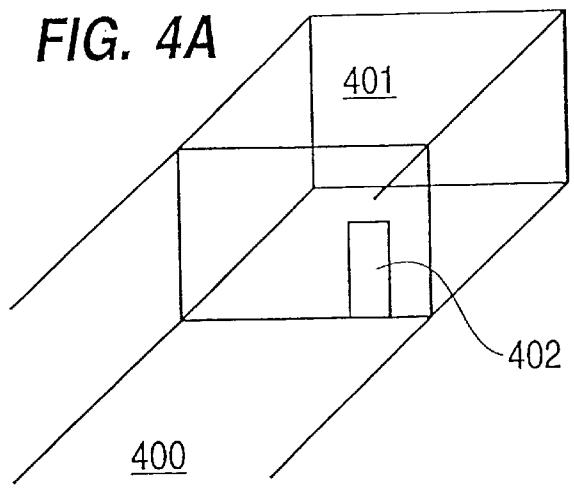
FIG. 4A represents a first space and a door to a second space.
Figure 4B:
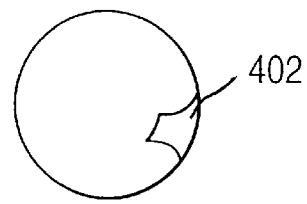
FIG. 4B and 4C represent fish-eye images.
Figure 4C:
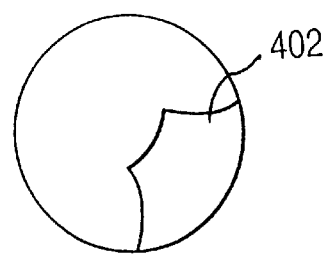
Figure 4D:
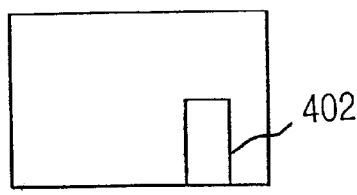
FIG. 4D represents a perspective corrected view of a wall and door.
Figure 4E:
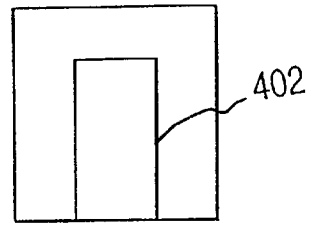
FIG. 4E and 4F represent movement toward the door by zooming.
Figure 4F:
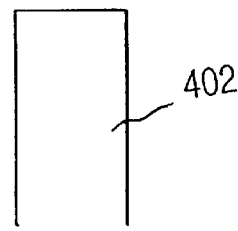
Figure 4G:
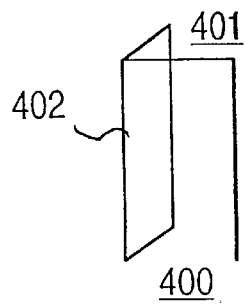
FIG. 4G represents a door opening to the second space.

Referring to FIG. 3b, the painting image portion 302 can be magnified beyond the degree of magnification selected for image overlay and insertion. While image portion 303 may be blurred from increasing magnification of the surrounding wall, the painting 302 is sharp and focused.

Now, when the user demagnifies or returns to an original position, the process may be remembered, modified and/or restored. Alternatively, the high resolution image may have an associated data file providing the address in memory of the associated interactive file so that at the selected angle of magnification, the associated interactive file border can be restored to the high resolution image.

Referring to FIG. 1, the principles of the present invention may be extended to another camera location 10. Camera location 10 will capture a different perspective of gallery wall 2 than from camera location 1. Nevertheless, the high resolution image 3 captured at location 1 may be perspective manipulated and inserted (overlaid) on a wall image 2 captured at camera location 10. Referring to FIG. 2, step 106, this step is shown of manipulating rectangular image 3 stored at step 102 and skewed at step 105 such that when displayed, the three or more predetermined points of the rectangular image are manipulated and processed to comply with the new perspective captured at camera location 10.

Step 106a, for example, represents capturing and manipulating a rectangular image for insertion into a left side view of a wall. Step 106b, for example, may represent the insertion of a rectangular image directly into a wall image as per camera location 1, where the rectangle may approximately appear as a rectangle in the perspective corrected wall image. Step 106c may refer to an image insertion from camera location 10 or from the right side of the wall. Step 106 demonstrates how the image can accept pan (or tilt) commands so that only a portion of the rectangular image portion is displayed in the combined or composite perspective corrected view.

FIG. 4 represents an application of the present invention for moving from one room to another of a building. Referring first to FIG. 4A, the application of the present invention permits a user to move from room or space 400 through a door 402 to a new space 401. FIG. 4B represents a fish eye lens captured image where the door portion for insertion is outdoors as seen from outside looking toward room or space 401 which is invisible to the user as yet. The camera taking this image is in space 400 pointed toward door 402. As the user moves toward the door threshold, the degree of magnification of the door 402 increases as seen by the wider door area of fish eye lens image FIG. 4C. FIG. 4B dewarped appears as FIG. 4D and FIG. 4C appears as FIG. 4E when dewarped. Now a high resolution (HR) image of a door 402 may comprise image FIG. 4F for insertion and show the door at various stages of opening to expose an interactive low resolution (LR) image of room/space 401 as the door opens per FIG. 4G. Consequently, one may apply the present invention to transition from one location to another using a plurality of flat still images of the opening between the spaces.

Using one's imagination, the present invention may be used in other applications besides providing a tour of an art gallery or other tour of a location. The interactive immersive image may comprise a sequence of images, for example, of a race course for automobiles. The user may be a virtual driver of a high resolution automobile that the driver drives through the race course. In such an embodiment, it is not required that the race course comprise completely cylindrical or spherical images, as it is unlikely that the virtual driver will be looking behind their vehicles in such a video game application. A sequence of single wide angle images of the race course may suffice and be called in sequence and speed depending on an acceleration/braking input. When the driver does wish to view where they have traveled, as through a rear view mirror, the rear view image may be separately stored and displayed. The rear view image need not be matched according to predetermined points except to the boundaries of the rear view mirror itself.

Thus, there has been shown and described a method for inserting a high resolution image into an interactive image experience that overcomes the problems of viewing an increasingly low resolution image as magnification increases by permitting an overlay of the high resolution image into the lower resolution image when the level of magnification reaches a predetermined value. Any United States patents and patent applications referenced herein should be deemed to be incorporated as to their entire contents. The present invention should only be deemed limited by the scope of the claims which follow.

What I claim is:

1. A method for viewing a realistic immersive interactive image comprising the steps of:

capturing a hemispherical interactive image at a first camera location, capturing a high resolution image portion of a particular detail in the hemispherical interactive image at a second camera location, dewarping the captured hemispherical interactive image to provide a perspective corrected image portion of the captured hemispherical interactive image using an image transformation process, receiving user inputs to view the perspective corrected image portion and magnify details in said image portion, and when a predetermined magnification threshold is exceeded as a user input degree of magnification increases, automatically overlaying the high resolution image portion in the perspective corrected image portion, wherein said overlaying comprises matching pixel values representing at least three points in the high resolution image portion with pixel values representing at least three different corresponding points in the perspective corrected image portion, said three different corresponding points defining a planar area for said overlaying step.

2. A method of capturing images for image overlay comprising the steps of capturing a wide angle interactive image at a first camera location, capturing at least one high resolution image portion in the wide angle interactive image;

dewarping the captured wide angle interactive image to provide a perspective corrected image portion of the captured wide angle interactive image using an image transformation process;

magnifying said perspective corrected portion in response to user input;

as a user input degree of magnification of said perspective corrected image portion increases and a predetermined magnification threshold is exceeded, matching pixel values representing at least three different reference points in said perspective corrected image portion with pixel values representing at least three corresponding reference points in said high resolution image, said three different reference points defining a correspondingly similar planar area; and based on said match, automatically overlaying the high resolution image portion to replace said planar area of the perspective corrected image portion at said predetermined magnification threshold.

3. A method of capturing images as recited in claim 2 wherein said wide angle interactive image is captured via a fish-eye lens.

4. A method of capturing images as recited in claim 2 further comprising the steps of digitally storing said wide angle interactive image and said high resolution image portion.

5. A method of capturing images as recited in claim 4 further comprising the step of associating a memory address for said wide angle interactive image with said high resolution image portion.

6. A method of capturing images as recited in claim 4 further comprising the step of associating a memory address for said high resolution image portion with said wide angle interactive image.

7. A method of capturing images as recited in claim 4 further comprising the step of compressing said digitally stored wide angle interactive image and said high resolution image portion prior to transmission.

8. A method of capturing images as recited in claim 2 further comprising the steps of digitally scanning said wide angle interactive image and storing said scanned image data.

9. A method of capturing images as recited in claim 2 further comprising the steps of digitally scanning said high resolution image portion and storing said scanned image data.

10. A method of capturing images as recited in claim 2 further comprising the steps of:

capturing a second wide angle interactive image at a second camera location corresponding to similar subject matter to the subject matter of said interactive image captured at said first camera location, and providing a second perspective corrected image portion of said captured second wide angle interactive image using the image transformation process.

11. A method of capturing images as recited in claim 10 further comprising the step of predetermining the identity of at least three reference points of said second perspective corrected wide angle interactive image portion.

12. A method of capturing images as recited in claim 2 wherein said camera for capturing one of said images comprises a digital camera.

13. A method of capturing images as recited in claim 2 wherein said camera for capturing one of said images comprises a still camera.

14. A method of capturing images as recited in claim 2 wherein said camera for capturing one of said images comprises a movie camera.

15. A method of capturing images as recited in claim 2 wherein said camera for capturing one of said images comprises a video camera.

16. A method of capturing images as recited in claim 2 wherein said wide angle interactive image and said high resolution image portion comprise similar image content, the method comprising the steps of scanning the wide angle interactive image at a low degree of resolution and scanning the high resolution image portion at a high degree of resolution.

17. A method of capturing images as recited in claim 10 further comprising the step of inserting said second perspective corrected image portion in said high resolution image portion to obtain a high resolution image for display.

18. A method of processing a wide angle interactive image and a high resolution image portion comprising the steps of:

storing said wide angle interactive image;

storing said high resolution image portion;

receiving input comprising a value of magnification;

perspective correcting a wide angle interactive image portion using an image transformation process;

matching pixel values representing at least three different reference points in said perspective corrected image portion with pixel values representing at least three corresponding reference points in said high resolution image portion, said three different reference points defining a planar area to be overlaid; and based on said match, automatically overlaying said planar area of said high resolution image portion on said perspective corrected image portion when said value of magnification exceeds a predetermined magnification threshold value during an image zooming process for increasing a user input degree of magnification.

19. A method of processing images as recited in claim 18 comprising the further step of storing the identity of at least three reference points of said high resolution image portion.

20. A method of processing images as recited in claim 18 comprising the further step of storing the identity of at least three reference points of said wide angle interactive image.

21. A method of processing images as recited in claim 19 further comprising the step of storing the identity of at least three corresponding reference points of said perspective corrected wide angle interactive image.

22. A method of processing images as recited in claim 19 further comprising the step of manipulating perspective of said high resolution image portion and overlaying said high resolution image portion so as to correspond to said three corresponding reference points of said perspective corrected wide angle interactive image portion.

23. A method of processing images according to claim 18 wherein a zoom sequence of interactive images are generated for display having similar subject matter, said zoom sequence comprising a first interactive image for display at a first level of magnification lower than said predetermined magnification value for said first interactive image at said first level of magnification and a second interactive image for display at a second level of magnification higher than said predetermined magnification level for said high resolution image overlaid on said first interactive image at said second level of magnification.

24. A method of processing images according to claim 18 comprising the step of cross-associating said wide angle interactive image with at least one high resolution image portion in memory.

25. The method of claim 2, said high resolution image portion being captured at the first camera location.

26. The method of claim 2, said high resolution image portion being captured at a second camera location closer to the content of the high resolution image portion of the wide angle interactive image.

27. The method of capturing images as recited in claim 2, said matching step further comprises the steps of:
predetermining a first set of pixel values representing said three different reference points in said perspective corrected image portion;
predetermining a second set of pixel values representing said three corresponding reference points in said high resolution image portion; and
comparing said first set of pixel values with said second set of pixel values for correct image overlay.

28. The method of capturing images as recited in claim 27, wherein a pixel value in each set has a high degree of differentiation from an adjacent pixel value.

29. The method of capturing images as recited in claim 27, wherein said first set of pixel values comprises corner values of said perspective corrected image portion.

30. The method of capturing images as recited in claim 27, wherein said second set of pixel values comprises corner values of said high resolution image portion.

31. A method of capturing images for image overlay comprising the steps of:
graphically rendering a wide angle interactive image;
capturing at least one high resolution image portion with a camera for overlay in said graphically rendered image;
dewarping the graphically rendered wide angle image portion to provide a perspective corrected image portion of the graphically rendered wide angle image using an image transformation process;
receiving user input degree of magnification until a predetermined magnification threshold is exceeded;
matching pixel values representing at least three different reference points in said perspective corrected image portion with pixel values representing at least three corresponding reference points in said high resolution image portion, said three different reference points defining a planar area to be overlaid; and
based on said match, automatically overlaying said planar area of said high resolution image portion in the perspective corrected image portion during a process of increasing said user input degree of magnification of said perspective corrected image portion at said predetermined magnification threshold.

32. A method of capturing images for image overlay comprising the steps of:
capturing a wide angle interactive image with a camera;
graphically rendering at least one high resolution image portion for overlay in said wide angle interactive image;
providing a perspective corrected image portion of the captured wide angle interactive image using an image transformation process;
matching pixel values representing at least three different reference points in said perspective corrected image portion with at least three corresponding reference points in said graphically rendered high resolution image portion, said three different point defining a planar area to be overlaid; and
based on said match, automatically overlaying said planar area of said graphically rendered high resolution image portion in the perspective corrected image portion at a predetermined degree of magnification when a predetermined magnification threshold is exceeded during a zooming process controlled by user input for increasing a degree of magnification.

33. A method for displaying a realistic immersive image sequence comprising the steps of:
displaying a hemispherical interactive image;
receiving user input zooming commands for zooming into a perspective corrected interactive image portion of said hemispherical interactive image, said zooming controlled by user input degree of magnification;
predetermining locations of at least three different corner pixels in said perspective corrected interactive image portion;
matching pixel values representing said corner pixels in said perspective corrected interactive image portion with pixel values representing corresponding corner pixels in a high resolution image portion, said three different corner pixels defining a planar area to be overlaid;
based on said match, displaying an automatic overlay of said planar area of said perspective corrected interactive image portion with said planar area of said high resolution image portion when a predetermined magnification threshold is exceeded during the image zooming step such that the realistic immersive image sequence is displayed.

* * * * *